United States Patent
Beier et al.

(10) Patent No.: US 11,584,349 B2
(45) Date of Patent: Feb. 21, 2023

(54) RELAY VALVE FOR A PNEUMATIC VALVE UNIT

(71) Applicant: ZF CV Systems Europe BV, Brussels (BE)

(72) Inventors: Peter Beier, Wunstorf (DE); Hartmut Schappler, Hannover (DE); Christian Oeser, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 17/623,924

(22) PCT Filed: Jul. 2, 2020

(86) PCT No.: PCT/EP2020/068639
§ 371 (c)(1),
(2) Date: Dec. 30, 2021

(87) PCT Pub. No.: WO2021/013491
PCT Pub. Date: Jan. 28, 2021

(65) Prior Publication Data
US 2022/0314951 A1  Oct. 6, 2022

(30) Foreign Application Priority Data

Jul. 23, 2019 (DE) ..................... 10 2019 119 808.9

(51) Int. Cl.
*B60T 15/18* (2006.01)
*B60T 15/54* (2006.01)
(Continued)

(52) U.S. Cl.
CPC ............ *B60T 15/18* (2013.01); *B60T 13/261* (2013.01); *B60T 13/683* (2013.01);
(Continued)

(58) Field of Classification Search
CPC ...... B60T 15/18; B60T 15/181; B60T 15/182; B60T 15/04; B60T 15/043; B60T 15/045;
(Continued)

(56) References Cited

U.S. PATENT DOCUMENTS 2,896,666 A * 7/1959 Rockwell .............. B60T 13/141
60/591
3,525,555 A * 8/1970 Gunter .................... B60T 15/20
303/56

FOREIGN PATENT DOCUMENTS

DE         10120323 C1    1/2003
DE    102009040759 A1    3/2011
(Continued)

OTHER PUBLICATIONS

European Patent Office, Rijswijk, Netherlands, International Search Report of International Application No. PCT/EP2020/068639, dated Sep. 2, 2020, 2 pages.

*Primary Examiner* — Thomas J Williams
(74) *Attorney, Agent, or Firm* — Dickinson Wright PLLC

(57) ABSTRACT

A relay valve (10) for a pneumatic valve unit (14), for example for a braking system of a utility vehicle, has a first assembly component (18) and a second assembly component (20). A hollow cylindrical guide portion (28) of a piston (24) of the relay valve (10) is received, in an axially guided manner, in the first assembly component (18). The second assembly component (20) includes additional valve components and the venting region of the relay valve (10). At least the first assembly component (18) and the second assembly component (20), when assembled, form a preassembly unit (26) first assembly component (18) and are joined by a bayonet connection (30). The preassembly unit (26) is inserted into a housing (12) of the valve unit (14), The
(Continued)

interior of the housing is delimited by a cup-shaped inner wall (32), and the preassembled unit is fastened therein.

14 Claims, 4 Drawing Sheets

(51) Int. Cl.
    *B60T 13/26*     (2006.01)
    *B60T 13/68*     (2006.01)
    *B60T 15/04*     (2006.01)
    *B60T 15/36*     (2006.01)

(52) U.S. Cl.
    CPC ............ *B60T 15/043* (2013.01); *B60T 15/36* (2013.01); *B60T 15/54* (2013.01)

(58) Field of Classification Search
    CPC ........ B60T 15/046; B60T 15/36; B60T 15/54; Y10T 137/86919
    USPC ...................................... 137/627.5
    See application file for complete search history.

(56) References Cited

FOREIGN PATENT DOCUMENTS

| | | | | |
|---|---|---|---|---|
| DE | 102014010955 | A1 | 1/2016 | |
| DE | 102015016663 | A1 * | 6/2017 | ............ B60T 15/046 |
| DE | 102015016663 | A1 | 6/2017 | |
| DE | 102016006009 | A1 | 11/2017 | |
| EP | 2266854 | A2 | 12/2010 | |
| WO | WO-2015192937 | A1 * | 12/2015 | ............ B60T 13/683 |

* cited by examiner

RELAY VALVE FOR A PNEUMATIC VALVE UNIT

TECHNICAL FIELD

The invention relates to a relay valve for a pneumatic valve unit, for example for a valve unit for a brake system of a utility vehicle, having a first assembly component and a second assembly component, wherein a hollow-cylindrical guide portion of a piston of the relay valve is or can be received in the first assembly component in an axially guided manner, and wherein the second assembly component has further valve components and the ventilation region of the relay valve.

BACKGROUND

A relay valve for a compressed-air brake system of a utility vehicle is known from EP 2 266 854 B1. The relay valve has a housing, a relay valve piston which is arranged laterally displaceably in the housing and which has a relay valve piston hole, and a relay valve cover which encloses the relay valve piston in the housing and which has a relay valve cover hole. The relay valve cover has at least one fastening means for fastening a noise damper to the relay valve cover, wherein the relay valve can be ventilated through the relay valve piston hole and through the relay valve cover hole to the noise damper, and wherein a control pressure chamber is bounded by the relay valve cover and the relay valve piston. This relay valve accordingly has a housing which can be closed by a cover and into which all the components of the relay valve are inserted and fastened one after the other in a complex manner. In addition, in all of the embodiments described in the document, means for axially guiding the piston of the relay valve are formed on the cover, so that actually a two-part housing is used. The cover is firmly connected to the housing by screws. Although this concept of a relay valve has proven itself to be serviceable, its assembly involves a comparatively high manufacturing effort.

SUMMARY

The invention was therefore based, inter alia, on the object of presenting a relay valve for a pneumatic valve unit, for example of a vehicle, that can be manufactured and assembled in a particularly simple and cost-effective manner.

Accordingly, the invention relates to a relay valve for a pneumatic valve unit, for example for a valve unit for a brake system of a utility vehicle, having a first assembly component and a second assembly component, wherein a hollow-cylindrical guide portion of a piston of the relay valve is configured to be received in the first assembly component in an axially guided manner, and wherein the second assembly component has further valve components and the ventilation region of the relay valve.

To achieve the stated object, it is provided that at least the first assembly component and the second assembly component in an assembled state form a pre-assembly unit, that the first assembly component and the second assembly component are joined together to produce the pre-assembly unit by a bayonet connection, and that the pre-assembly unit is inserted into an interior space of a housing of the valve unit, the interior space being bounded by a pot-shaped inner wall, and fastened therein.

This results in a considerable simplification of the assembly process of the relay valve, which is associated with a reduction in production costs. Such a pre-assembly unit constructed as described, which comprises all the components of the relay valve that are within the housing, can be pre-assembled in some other way and simply inserted into the housing of the relay valve or of the valve unit and fixed therein by a securing ring, etc. As an alternative to this, it is also possible for the piston of the relay valve to firstly be inserted into the interior space of the housing of the relay valve. Subsequently, the two assembly components connected by the bayonet connection can then be inserted into the housing in the form of a virtually one-piece pre-assembly unit and fastened therein. The valve unit according to the invention can, optionally together with further components, be a constituent part of an electronic brake system of a parking brake and/or an axle modulator for regulating such brake systems of a utility vehicle.

According to a technically advantageous configuration of the relay valve having the features of the invention, it is provided that the guide portion of the piston has a central stepped bore penetrating this and a piston plate of the piston, that a guide pin which is aligned centrally with respect to a longitudinal center axis of the relay valve is formed on the inner base of the housing, and that the stepped bore of the piston is received on the guide pin and guided by it in an axially displaceable manner. This ensures precise axial guidance of the piston in the housing, wherein an inlet valve and an outlet valve or the functions thereof can be actuated by the piston.

It may furthermore be provided that the first assembly component has a frustoconical basic geometry and the second assembly component has a cylindrical basic geometry, each with a central axial bore, that the a hollow-cylindrical guide portion of the piston is received in the central bore of the first assembly component in an axially movable manner, that a hollow-cylindrical valve disk guide is fastened in the central bore of the second assembly component and has a valve disk mounted in an axially movable manner at its axially inner end, that a bead-like, circular, axially protruding sealing seat formed radially at the inside on the first assembly component and the valve disk, which is loaded with a spring force against this sealing seat by a first compression spring, of the second assembly component form an inlet valve of the relay valve, and that an annular sealing portion at the axially free end of the piston rod and the valve disk on the second assembly component form an outlet valve. This ensures precise axial guidance of the piston in the housing. In addition, an inlet valve function and an outlet valve function of the relay valve are provided, both of which are activated or deactivated by the piston.

Another favorable configuration of the relay valve having the features of the invention provides that the first assembly component has two groups, which are arranged radially opposite one another and are spaced apart from one another in relation to the longitudinal axis of the relay valve, with in each case at least three ribs, which are spaced apart from one another and directed radially outward, for the purpose of guiding air, that these ribs within the two groups are formed in each case so as to be aligned with one another, that in at least one group at least one rib has a radially outwardly directed alignment projection which is arranged, as an assembly aid to ensure a properly aligned installation position of the pre-assembly unit in the circumferential direction with optimal airflow, at least in certain regions form-fittingly in an associated, geometrically complementary cutout in the inner wall of the housing of the valve unit.

As an alternative to this, it may be provided that the first assembly component has two groups, which are arranged radially opposite one another and are spaced apart from one another in relation to the longitudinal axis of the relay valve, with in each case at least three ribs, which are spaced apart from one another and directed radially outward, for the purpose of guiding air, that these ribs within the two groups are formed in each case so as to be aligned with one another, that in at least one group at least one rib has a radially outwardly directed alignment projection which serves as a visual assembly aid to ensure a properly aligned installation position of the pre-assembly unit in the circumferential direction with optimal airflow, without this alignment projection engaging in an associated cutout in the inner wall of the housing of the valve unit for this purpose.

The grouped parallel ribs of the first assembly component ensure an optimal, largely low-turbulence airflow within the relay valve. Here, the alignment projection always enables the correct circumferential installation position of the pre-assembly unit in the housing of the relay valve, or that of the valve unit, for an optimal air conduction function in same. This rules out assembly errors. At the same time, the ribs increase the mechanical strength of the first assembly component. In the context of the description, the expression "circumferential position" of the pre-assembly unit of the relay valve relates to a certain angle of rotation of the pre-assembly unit about the longitudinal center axis of the relay valve when it is being inserted into the interior space of the housing to create the relay valve, at which angle the alignment projection engages with the cutout in the inner wall and thus the correct installation position is ensured.

In this context, it may be provided that on the first assembly component, orthogonally to the ribs of the two groups, at least two mutually opposite transverse ribs are formed so as to be aligned with one another. This further increases the mechanical stiffness of the first assembly component.

Here, it is provided that the two groups having the in each case at least three ribs and the at least two transverse ribs are formed and arranged such that they leave free an approximately cylindrical interior space which is formed coaxially to the longitudinal center axis and through which the guide portion of the piston is axially guided. This leaves enough space for the piston rod, which coaxially surrounds the guide pin, to be guided axially through the first assembly component.

Furthermore, it is preferably provided that the at least one alignment projection is arranged on the at least one rib in the circumferential direction in such a way that an optimal airflow is produced when the pre-assembly unit is inserted into the housing of the valve unit. As a result, the ribs of the two groups are always aligned in clear and optimal fashion with respect to the primary airflow within the housing of the valve unit and the assembly process is thereby considerably simplified.

It may also be provided that the second assembly component has axially at the outside an axial extension of relatively small diameter and an axial extension of relatively large diameter, which are formed coaxially to the longitudinal center axis, wherein the extension of relatively small diameter, following the outlet valve, encloses a ventilation space of the relay valve. This results in a high degree of functional integration of the second assembly component. In particular, a reliable pneumatic connection to a preferably acoustic damping element is ensured by the extension of relatively small diameter that forms a vent on the second assembly component.

Furthermore, it is preferably provided that the valve disk guide fastened to the second assembly component has an inner annular wall and an outer annular wall arranged coaxially thereto, wherein an annular space with a base for receiving an axial end of the first compression spring is formed between the inner annular wall and the outer annular wall. In this way, the valve disk and the aforementioned first compression spring are guided and secured in position in a reliable manner.

Another refinement of the relay valve having the features of the invention provides that the inner annular wall of the valve disk guide has a multiplicity of longitudinal ribs which are uniformly spaced apart from one another in the circumferential direction and oriented parallel to the longitudinal center axis. This results in a sound absorption effect for the compressed air exiting via the ventilation space.

Preferably, free ends of the axial extensions of relatively small and relatively large diameter each have a cutting edge. In this way, during the assembly of the relay valve, the aforementioned extensions can be more easily pressed into an open-pored insulating element, such as for example an acoustic non-woven damping material or knitted damping fabric of the ventilation system.

The extension of relatively small diameter preferably has at least one web running transversely to the longitudinal center axis. This advantageously increases the component stiffness in this portion of the relay valve. In addition, this web reduces the speed of outflowing air and thus at the same time reduces the noise production thereof. Moreover, this web has an at least rudimentary filter function with respect to foreign bodies. Finally, the web can optionally serve as a point of engagement for a suitable tool when the relay valve is being removed.

According to another favorable development, at least the first assembly component is designed or arranged so as to have a vibration-damping effect. This considerably attenuates operating noises of the relay valve. For this purpose, the two assembly components may be produced, for example, from or with a vibration-damping plastic or the like.

It may also be provided that, in the region of a cover portion close to the piston plate, the first assembly component has an annular groove which faces an underside of the piston plate, the underside being close to the guide portion, and that the one axial end of a second compression spring, which is supported by way of its other axial end on the piston plate, is arranged in the annular groove. The magnitude of a control air pressure necessary for actuating the piston can be set by such a compression spring. In addition, the compression spring assists the return of the piston to its non-actuated starting position.

It may furthermore be provided that at least one pressure sensor or a temperature sensor is integrated into the first assembly component and/or the second assembly component of the relay valve. In this way, additional functions are integrated into the relay valve in a cost-effective manner. By way of example, the risk of the relay valve icing up under certain operating conditions can be detected at an early stage by such sensors.

Finally, all the necessary sealing rings are arranged on the two assembly components and are inserted into circular grooves on the first assembly component and on the second assembly component.

For better understanding of the invention, a set of drawings is enclosed with the description.

DETAILED DESCRIPTION OF THE DRAWINGS

Figure 1:
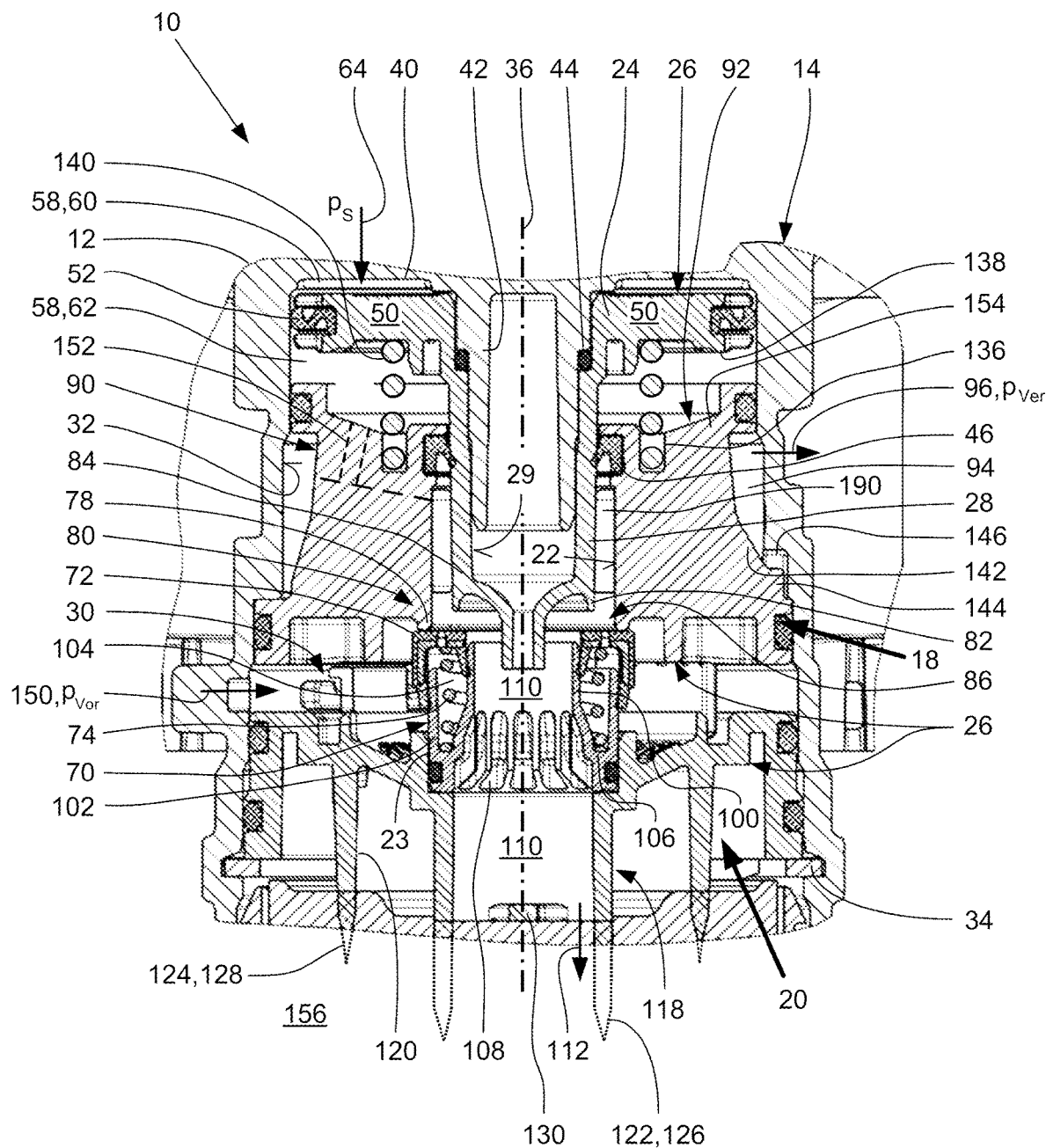
FIG. 1 shows a longitudinal section through a relay valve having the features of the invention and having a pot-shaped housing and a pre-assembly unit composed of two assembly components positioned in the housing.

The relay valve 10 illustrated in FIG. 1 is received in a housing 12 of a pneumatic valve unit 14 of a brake system (not illustrated) of a utility vehicle (also not shown).

The relay valve 10 has a first assembly component 18 and a second assembly component 20 as well as a piston 24, wherein the first assembly component 18 and the second assembly component 20, and preferably also the piston 24, collectively form a pre-assembly unit 26 in the assembled state. The first assembly component 18 and the second assembly component 20 are firmly connected to one another by a bayonet connection 30, and a hollow-cylindrical guide portion 28 of the piston 24 is received centrally within the first assembly component 18 in an axially displaceable manner.

This pre-assembly unit 26 is inserted into a pot-like and stepped inner wall 32 of the housing 12 of the valve unit 14, the inner wall being open on one side, and merely in exemplary fashion is axially secured in position and fastened therein by a securing ring 34. This results in a considerable simplification of the assembly process of the relay valve 10 within the housing 12 of the valve unit 14, since the pre-assembly unit 26 as a whole can be pushed into the housing 12. The inner wall 32, the piston 24 and the two assembly components 18, 20 are constructed in a substantially rotationally symmetrical manner with respect to a longitudinal center axis 36. In this case, the two assembly components 18, 20 have a largely frustoconical or cylindrical basic geometry, each with a central bore 22, 23. The central bore 22 in the first assembly component 18 forms an interior space 190 through which the guide portion 28 of the piston 24 is guided. At least the first assembly component 18 is preferably designed to have a vibration-damping effect, for example by producing it from a suitable vibration-damping plastic.

On a base 40 of the inner wall 32 of the housing 12, there is a guide pin 42 of hollow-cylindrical form here which is arranged centrally with respect to the longitudinal center axis 36 and on which the piston 24 is received in an axially displaceable manner. To this end, the piston 24 has a central stepped bore 29 penetrating its hollow-cylindrical guide portion 28 and its piston plate 50, the guide pin 42 being arranged in certain portions within the stepped bore 29 of the piston 24. The sealing between the piston 24 and the guide pin 42 is effected by a sealing ring 44 which is elliptical in its installation position.

In the further course of the description, for the sake of better clarity of the drawing, the rest of the elliptical and cross-hatched sealing rings are not provided with reference numbers in the drawing figures. The sealing and/or a supporting radial guidance of the guide portion 28 of the piston 24 within the first assembly component 18 is effected by a lip sealing ring 46. The substantially disk-shaped solid piston plate 50 of the piston 24 is sealed radially at the outside with respect to the inner wall 32 by a Z-shaped sealing ring 52. The use of the lip sealing ring 46 is not necessary for every design of this relay valve. When using it, however, pressure equalization must be ensured, which is explained further below.

A substantially cylindrical working space 58 is formed between the first assembly component 18 and the base 40 and is divided by the piston plate 50 into an upper chamber 60 and a lower chamber 62. As indicated by an arrow 64, a control pressure ps can be applied to the upper chamber 60 to control the relay valve 10. Compressed air with the output supply pressure or, for example, brake pressure is located in the lower chamber 62.

A valve disk guide 70 for axially guiding an approximately circular-ring-shaped valve disk 72 and for securing the position of a first compression spring 74 is fastened to the second assembly component 20. The valve disk 72 preferably has a rubberized upper side, which is not designated for the sake of better clarity of the drawing, with an approximately circular-ring-shaped geometry, which is mechanically stabilized with an internal and annularly encircling metal or plastics profile, which is also not designated, with an L-shaped cross-sectional geometry. By the spring force of a first compression spring 74, the valve disk 72 is loaded axially against a bead-like, encircling, axially protruding sealing seat 78 of the first assembly component 18 and, together with the sealing seat, forms an inlet valve 80. An annular sealing portion 82 at an axially free end 84 of the guide portion 28 of the piston 24 forms an outlet valve 86 in cooperation with the valve disk 72.

A first group 90 and a second group 92 of ribs are also integrally formed on the first assembly component 18, each group 90, 92 preferably having in each case three ribs running parallel to and spaced apart from the plane of the drawing for the purpose of guiding air (see description relating to FIG. 1 further below and to FIGS. 2 and 3). Here, the two groups 90, 92 with the ribs are arranged radially opposite one another and spaced apart from one another radially at the inside, in order to allow the guide portion 28 of the piston 24, the guide portion being received on the guide pin 42, to be coaxially guided through.

An approximately annular space 94 between the first assembly component 18 and the inner wall 32 is connected by a channel (not illustrated) for example to a brake cylinder (also not shown) of the brake system, such that it is possible, as indicated by another arrow 96, for a supply pressure $p_{Ver}$ to be applied to the brake cylinder in a manner controlled by the relay valve 10 in order to actuate the brake cylinder or another pneumatic consumer. This supply pressure $p_{Ver}$ can also be referred to as the supply pressure $p_{Ver}$ output by the relay valve.

The valve disk guide 70 has an inner annular wall 100 and an outer annular wall 102 coaxially surrounding the latter, an annular space 104 with a base 106 being formed radially between the inner annular wall 100 and the outer annular wall 102. Arranged in this annular space 104 is the first compression spring 74, one axial end of which is supported on the base 106 of the valve disk guide 70 and the other axial end of which is supported on the underside of the valve disk 72.

The valve disk 72 is sealed off from both the inner and outer annular walls 100, 102 and/or guided axially by sealing lips or sealing edges (not designated) that are embodied integrally with its rubber coating. The inner annular wall 100 of the valve disk guide 70 has a multiplicity of longitudinal ribs 108 running circumferentially relative to one another and approximately parallel to the longitudinal center axis 36. This results in a sound absorption effect on the ventilation flow 112 exiting via a ventilation space 110 of the relay valve 10. In addition, this results in a largely laminar airflow in the region of the ventilation space 110.

The second assembly component 20 has an axial extension 118 of relatively small diameter formed integrally thereon, and also an axial extension 120 of relatively large diameter, the latter enclosing the extension 118 of relatively small diameter in a coaxially spaced-apart manner. Here, the two extensions 118, 120 each have a substantially hollow-cylindrical geometry. Here, the axial length of the extension 120 of relatively large diameter, which is not designated for the sake of better clarity of the drawing, is dimensioned to be smaller than the axial length of the extension 118 of relatively small diameter, which is likewise not designated. The extension 118 of relatively small diameter encloses the ventilation space 110 of the relay valve 10.

The free end 122 of the extension 118 of relatively small diameter and a free end 124 of the extension 120 of relatively large diameter are each designed as a cutting edge 126, 128 with a small radius of curvature. Due to the cutting edges 126, 128, an optimal pneumatic connection of the ventilation space 110 of the relay valve 10 to an acoustic damping element (not illustrated in the drawing) for minimizing operating noises of the relay valve 10 is provided. For this purpose, the damping element has a suitable nonwoven material or knitted fabric. In addition, at least one web 130 is integrally formed within the extension 118 of relatively small diameter, the web 130 functioning inter alia as a screen element running perpendicular to the longitudinal center axis 36. The web 130 primarily serves to hold back foreign bodies or the like, but it can also be used as a point of engagement for a tool for removing the pre-assembly unit 26 from the housing 12 of the valve unit 14.

The first assembly component 18 also has, on its cover portion 154 close to the piston plate, an annular groove 136, the opening of which faces the underside 138 of the piston 24 and in which a second compression spring 140 for adjusting the response behavior of the piston 24 can optionally be received.

A rib 142 within the second group 92 of ribs has a radially outwardly directed alignment projection 144 which, in the correct assembly state of the pre-assembly unit 26 illustrated here, engages at least in certain regions form-fittingly in a cutout 146 of the housing 12 within the inner wall 32 of the housing 12 of the valve unit 14. For this purpose, this cutout 146 is designed to be substantially geometrically complementary to the alignment projection 144 on the rib 142. Here, the cutout 146 is positioned circumferentially in the inner wall 32 in such a way that when the pre-assembly unit 26 is inserted into the housing 12 of the valve unit 14, there is an optimal flow of air within the relay valve 10, in particular in the region of the ribs of the first assembly component 18 between the guide portion 28 of the piston 24 and the inner wall 32.

A further channel within the housing 12 of the valve unit 14 is used to supply a reservoir pressure $p_{Vor}$, as indicated merely symbolically by the arrow 150, to the relay valve 10 in the region of the bayonet connection 30. Here, the reservoir pressure $p_{Vor}$ is provided by a compressed-air supply unit, such as a compressor of the utility vehicle.

In the switching position shown in FIG. 1, the piston 24 of the relay valve 10 is not actuated, with the result that the inlet valve 80 is closed and the outlet valve 86 is open. Any brake pressure still present in a brake cylinder can thus pass, counter to the orientation of the arrow 96, via the aforementioned space 94 along the ribs of the first assembly component 18 in the radially inward direction to an interior space 190, and from there via the valve disk guide 70 to the ventilation space 110. From there, the compressed air passes via the damping element (not illustrated) to the external environment 156 of the housing 12 of the valve unit 14.

If the upper chamber 60 of the working space 58 has applied to it a control pressure $p_s$ high enough that the control pressure in the upper chamber 60 is higher than a current pressure in the lower chamber 62 of the working space 58, then the piston 24 moves axially in the direction of the ventilation space 110 until the piston plate 50 strikes against the first assembly component 18. The outlet valve 86 is then closed and the inlet valve 80 is open, since the annular sealing portion 82 of the guide portion 28 of the piston 24 is pressed axially counter to the preload force of the first compression spring 74 against the valve disk 72. At the same time, the valve disk 72 is lifted off from the bead-like sealing seat 78 of the first assembly component 18. Now the reservoir pressure $p_{Vor}$, as indicated by the arrow 150, can pass via the open inlet valve 80 and through the ribs of the first assembly component 18 into the aforementioned space 94 and from there can, as indicated by the arrow 96, be applied to a brake cylinder or another pneumatic consumer for actuation purposes. The response behavior of the piston 24 is set here by the optional second compression spring 140.

If the control pressure ps in the upper chamber 60 of the working space 58 is lowered to below a current pressure in the lower chamber 62 of the working space 58, then the piston 24, here assisted by the spring force of the second compression spring 140, moves back into the axial starting position illustrated in FIG. 1, in which the inlet valve 80 is closed again and the outlet valve 86 is open for ventilation of the brake cylinder or of another pneumatic consumer.

The upward movement of the piston 24 is assisted at least partially by a small diaphragm opening 152 or bore with a small cross section, through which a small amount of any residual pressure from a brake cylinder or another pneumatic consumer can pass, counter to the direction of the arrow 96, into the cylindrical space 94 of the first assembly component 18 equipped with ribs and from there into the lower chamber 62 of the working space 58 on the piston 24. For this purpose, a funnel-like cover portion 154 of the first assembly component 18 facing the piston 24 is completely axially penetrated by the at least one diaphragm opening 152.

If a lip sealing ring 52 resting on the guide portion 28 of the piston 24 is not used, this diaphragm opening 152 can be dispensed with. In such a design, when the piston 24 moves upward to the position illustrated in FIG. 1, compressed air flows from the cylindrical space 94 on the radial outer side of the first assembly component 18 along its ribs 90, 92 in the radially inward direction to the interior space 190 surrounding the guide portion 28 of the piston 24 and from there along the radial outer side of the guide portion 28 axially in the direction of the piston 24 into the lower chamber 62 of the working space 58.

Moreover, the mode of operation of such a relay valve is sufficiently familiar to a person skilled in the art working in the field of compressed-air technology, and so a more detailed description can be dispensed with.

In each case, at least one sensor, in particular an electronic pressure sensor or a temperature sensor, can be integrated into the first assembly component 18 and/or the second assembly component 20. In this way, critical operating states of the relay valve 10, which may for example cause components of the relay valve 10 to ice up, can be detected in good time. Such critical operating states, which under unfavorable circumstances may bring about at least a partial failure of the relay valve 10, can then be counteracted for example by suitable control of the relay valve 10 and/or the activation of an electrical heating device (not illustrated in the drawings).

Figure 2:
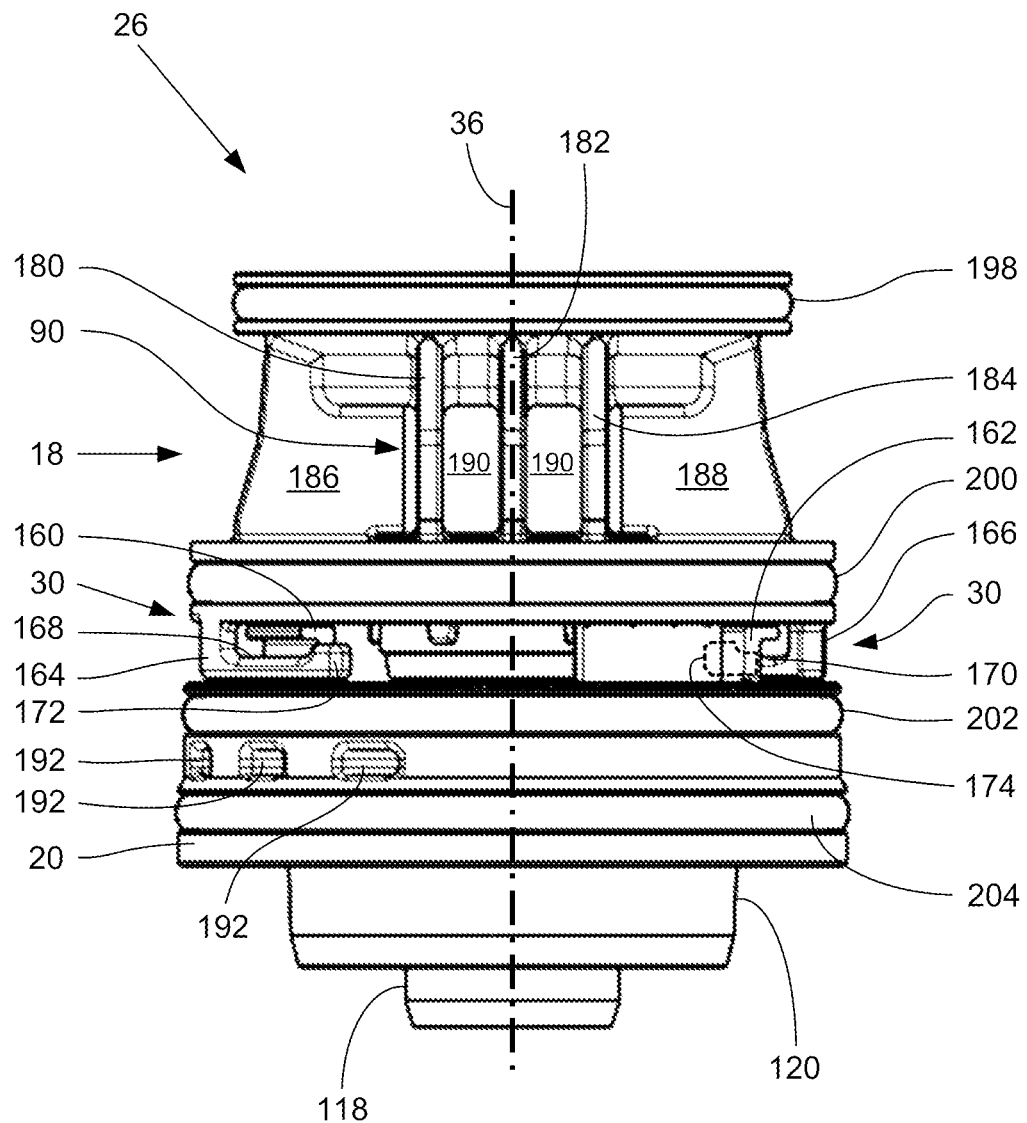
FIG. 2 shows a side view of the pre-assembly unit of the relay valve as per FIG. 1 without a piston.

FIG. 2 shows a side view of a pre-assembly unit of the relay valve 10 as per FIG. 1 without the piston 24. The pre-assembly unit 26, which is constructed in a substantially rotationally symmetrical manner with respect to the longitudinal center axis 36 and which is illustrated without the piston, comprises the substantially frustoconical first assembly component 18 and the substantially cylindrical second assembly component 20. These two assembly components 18, 20 are mechanically firmly connected to one another by the bayonet connection 30 already mentioned.

To create the bayonet connection 30 that can be locked and released again by a combined plug-and-turn movement, the second assembly component 20 has a first and a second bayonet component 160, 162, which are directed radially outward and are arranged diametrically opposite one another. Two latching hooks 164, 166 are integrally formed on the first assembly component 18, which are also positioned opposite one another. In the locked state of the bayonet connection 30 illustrated here, the two latching hooks 164, 166 of the first assembly component 18 engage in each case with a resilient latching action behind the two bayonet components 160, 162 of the second assembly component 20. The latching hooks 164, 166 each have a recess 168, 170 and a latching projection 172, 174 which is formed in each case in the region of a free end of the latching hooks 164, 166 and points in the direction of the first assembly component 18. In the locked state of the bayonet connection 30 shown here, the bayonet components 160, 162 are each received at least in certain regions in a form-fitting manner in one of the recesses 168, 170 of the latching hooks 164, 166 and are each secured against unintentional loosening of the bayonet connection 30 by way of the latching projections 172, 174.

Figure 3:
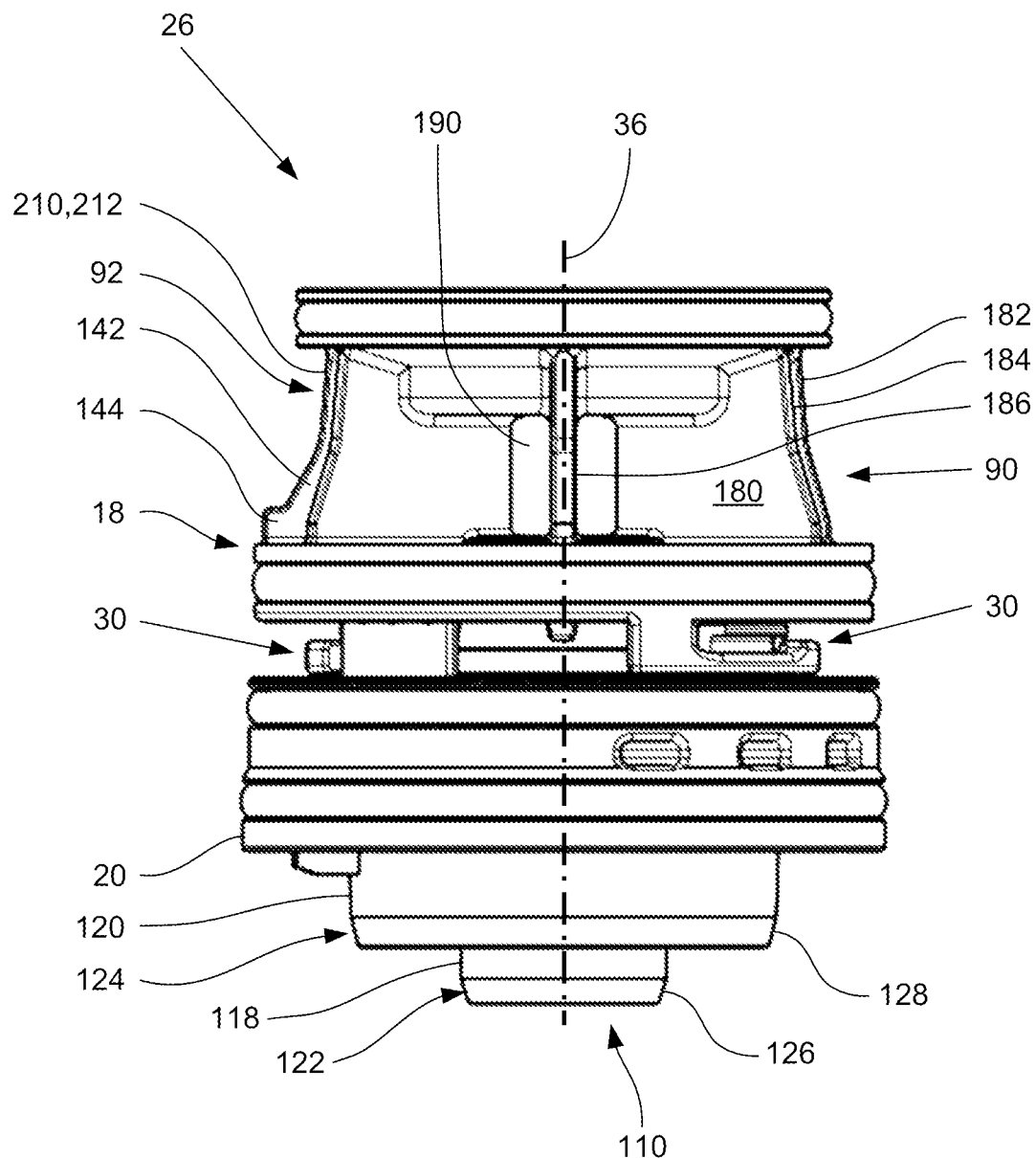
FIG. 3 shows the pre-assembly unit without the piston in a side view rotated through 90° about a longitudinal center axis in relation to FIG. 2.

In addition, the first group 90 of ribs is illustrated with three ribs 180, 182, 184 running spaced apart from one another in parallel for optimization of the airflow within the relay valve 10, while the ribs of the second group are concealed here (see, in this respect, FIG. 3). A first transverse rib 186 and a second transverse rib 188 are arranged radially opposite one another, and are positioned so as to be radially spaced apart and aligned with one another. The two transverse ribs 186, 188, visible from their side, each run perpendicular to the ribs 180, 182, 184 of the first group 90, the ends of which are visible, and the ribs of the second group that are not visible. The ribs 180, 182, 184 of the first group 90, the ribs of the second group and the two transverse ribs 186, 188 together bound, radially at the inside, an approximately cylindrical interior space 190 which is oriented centrally with respect to the longitudinal center axis 36 and through which the guide portion 28 of the piston 24 is guided.

Here, by way of example, the second assembly component 20 has three radial ventilation openings 192 and the two hollow-cylindrical extensions 122, 124 on the underside. The pneumatic sealing of the pre-assembly unit 26 within the inner wall 32 of the housing 12 of the valve unit 14 is effected with the aid of four sealing rings 198, 200, 202, 204, which are for example polymeric O-rings. It can be seen that in each case two sealing rings 198, 200 are arranged on the first assembly component 19 and two sealing rings 202, 204 are arranged on the second assembly component 20.

FIG. 3 shows the pre-assembly unit 26 as per FIG. 2, likewise without the piston 24, in a side view rotated through 90° about a longitudinal center axis. In this illustration, the pre-assembly unit 26 of the relay valve 10 is also constructed by the assembly components 18, 20 which are firmly connected to one another by the bayonet connection 30.

The first group 90 of ribs comprises the three ribs 182, 184, 186 which run parallel to the plane of the drawing and spaced apart from each another and which are only partially visible in FIG. 3. Correspondingly, in addition to the central rib 142 with the alignment projection 144, the second group 92 of ribs comprises two further ribs 210, 212, which run so as to be parallel to and spaced apart from this rib 142 on both sides. The ribs 180, 182, 184 of the first group 90 and the ribs 142, 210, 212 of the second group 92 each lie opposite one another and are spaced apart from one another in a symmetrical manner perpendicularly with respect to the longitudinal center axis 36 and are each formed integrally on the first assembly component 18 so as to be aligned with one another.

At the lower end of the second assembly component 20, the already mentioned two hollow-cylindrical extensions 118, 120 run coaxially to the longitudinal center axis 36, wherein the free end 122 of the extension 118 of relatively small diameter has the already mentioned cutting edge 126 and the already explained cutting edge 128 is formed on the extension 120 of relatively large diameter. The extension 118 of relatively small diameter encloses the ventilation space 110 of the relay valve 10 illustrated in FIG. 1.

Figure 4:
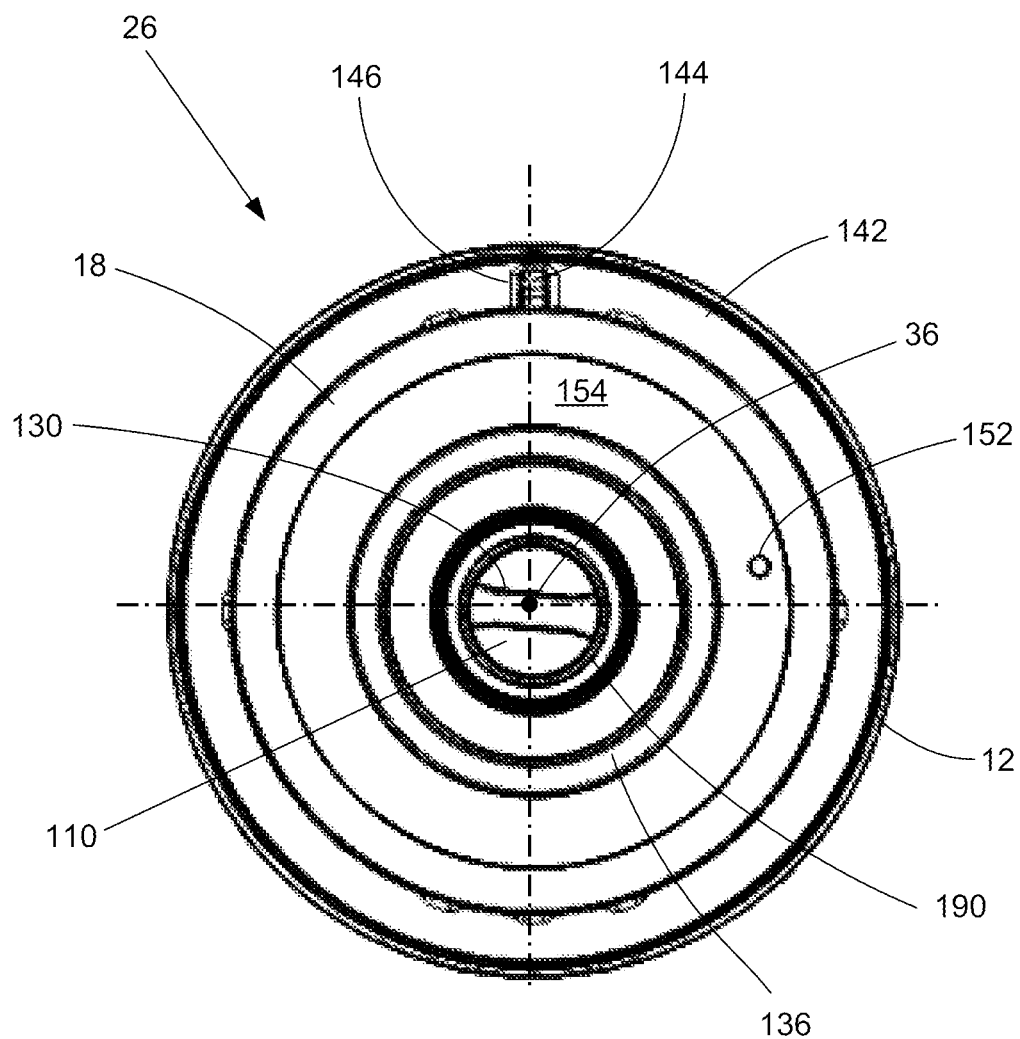
FIG. 4 shows a plan view of the pre-assembly unit as per FIGS. 1 to 3 without the piston.

FIG. 4 shows a simplified plan view of the pre-assembly unit 26 as per FIGS. 1 to 3, likewise without the piston 24, specifically as seen from the cover portion 154, which is close to the housing base, of the first assembly component 18 in the direction of the second assembly component 20. As can be seen, the first assembly component 18 of the pre-assembly unit 26 is formed in a substantially rotationally symmetrical manner with respect to the longitudinal center axis 36. The annular groove 136, in which the second compression spring 140 can be received, can be seen on the cover portion 154, which is close to the housing base, of the first assembly component 18. In addition, the rib 142 on which the radially protruding alignment projection 144 is formed can be seen on the first assembly component 18, the alignment projection engaging in an associated cutout 146 in the inner wall 32 of the housing 12. In the region of the ventilation space 110, the approximately cuboidal web 130 functioning as a screen runs transversely to the longitudinal center axis 36. The web 130 is formed integrally on the second assembly component 20. The cylindrical interior space 190, which is enclosed radially at the inside by the ribs (not illustrated here) of the first assembly component 18 and through which the piston of the relay valve is guided, likewise runs coaxially to the longitudinal center axis 36. The diaphragm opening 152 in the cover portion 154 of the first assembly component 18 can also be seen.

The invention claimed is:

1. A relay valve (10) for a pneumatic valve unit (14) for a brake system, comprising:
  a first assembly component (18) and a second assembly component (20), wherein the first assembly component is configured to receive a hollow-cylindrical guide portion (28) of a piston (24) of the relay valve (10) in an axially guided manner, and wherein the second assembly component (20) has further valve components and a ventilation region of the relay valve (10), wherein at least the first assembly component (18) and the second assembly component (20), in an assembled state, form a pre-assembly unit (26), wherein the first assembly component (18) and the second assembly component (20) are joined together to produce the pre-assembly unit (26) by a bayonet connection (30), and wherein the pre-assembly unit (26) is inserted into an interior space of a housing (12) of the valve unit (14), the interior space being bounded by a pot-shaped inner wall (32), and fastened therein, further comprising the piston (24), wherein the guide portion (28) has a central stepped bore (29) penetrating the guide portion (28) and a piston plate (50) of the piston (24), wherein a guide pin (42) aligned centrally with respect to a longitudinal center axis (36) of the relay valve (10) is formed on an inner base (40) of the housing (12), and wherein the stepped bore (29) of the piston (24) is received on the guide pin (42) and guided by it in an axially displaceable manner.

2. The relay valve as claimed in claim 1, wherein the first assembly component (18) has a frustoconical basic geometry and the second assembly component (20) has a cylindrical basic geometry, each with a central axial bore (22; 23), wherein the guide portion (28) of the piston (24) is received in the central bore (22) of the first assembly component (18) in an axially movable manner, wherein a hollow-cylindrical valve disk guide (70) is fastened in the central bore (23) of the second assembly component (20) and has a valve disk (72) mounted in an axially movable manner at its axially inner end, wherein a circular, axially protruding sealing seat (78) formed radially at the inside on the first assembly component (18) and the valve disk (72), which is loaded with a spring force against this sealing seat (78) by a first compression spring (74), of the second assembly component (20) form an inlet valve (80) of the relay valve (10), and wherein an annular sealing portion (82) at an axially free end (84) of the guide portion (28) of the piston (24) and the valve disk (72) on the second assembly component (20) form an outlet valve (86).

3. The relay valve as claimed in claim 2, wherein a lip sealing ring (46) is arranged in the central bore (22) of the first assembly component (18) and acts in a sealing and radially guiding manner against cylindrical outer side of the guide portion (28) of the piston (24).

4. The relay valve as claimed in claim 3, wherein the second assembly component (20) has axially at the outside an axial extension (118) of relatively small diameter and an axial extension (120) of relatively large diameter, which is larger than the relatively small diameter, the axial extensions of relatively small and of relatively large diameter being formed coaxially to the longitudinal center axis (36), wherein the axial extension (118) of relatively small diameter, following the outlet valve (86), encloses a ventilation space (110) of the relay valve (10).

5. The relay valve as claimed in claim 4, wherein each of the axial extensions (118, 120) of relatively small and relatively large diameter has a free end (122, 124) with a cutting edge (126, 128).

6. The relay valve as claimed in claim 5, wherein the axial extension (118) of relatively small diameter has at least one web (130) running transversely to the longitudinal center axis (36).

7. The relay valve as claimed in claim 3, wherein the valve disk guide (70) fastened to the second assembly component (20) has an inner annular wall (100) and an outer annular wall (102) arranged coaxially thereto, wherein an annular space (104) with a base (106) for receiving an axial end of the first compression spring (74) is formed between the inner annular wall (100) and the outer annular wall (102).

8. The relay valve as claimed in claim 7, wherein the inner annular wall (100) of the valve disk guide (70) has a multiplicity of longitudinal ribs (108) which are uniformly spaced apart from one another in the circumferential direction and oriented parallel to the longitudinal center axis (36).

9. The relay valve as claimed in claim 1, wherein in a region of a cover portion (154) facing the piston plate (50), the first assembly component (18) has an annular groove (136) facing a piston-guide-side underside (138) of the piston (24), and further comprising a compression spring (140) supported at one axial end on the piston plate (50), with an opposite axial end of the second compression spring being arranged in the annular groove (136).

10. A relay valve (10) for a pneumatic valve unit (14) for a brake system, comprising:

a first assembly component (18) and a second assembly component (20), wherein the first assembly component is configured to receive a hollow-cylindrical guide portion (28) of a piston (24) of the relay valve (10) in an axially guided manner, and wherein the second assembly component (20) has further valve components and a ventilation region of the relay valve (10), wherein at least the first assembly component (18) and the second assembly component (20), in an assembled state, form a pre-assembly unit (26), wherein the first assembly component (18) and the second assembly component (20) are joined together to produce the pre-assembly unit (26) by a bayonet connection (30), wherein the pre-assembly unit (26) is inserted into an interior space of a housing (12) of the valve unit (14), the interior space being bounded by a pot-shaped inner wall (32), and fastened therein, and wherein the first assembly component (18) has two rib groups (90, 92), which are arranged radially opposite one another and are spaced apart from one another in relation to a longitudinal center axis (36) of the relay valve (10), each of the two rib groups having at least three ribs (142, 180, 182, 184, 210, 212), which are spaced apart from one another and directed radially outward, for the purpose of guiding air, wherein on the first assembly component (18), orthogonally to the ribs (142, 180, 182, 184, 210, 212) of the two rib groups (90, 92), at least two mutually opposite transverse ribs (186, 188) are formed so as to be aligned with one another.

11. The relay valve as claimed in claim 10, wherein the two rib groups (90, 92) and the at least two transverse ribs (186, 188) are formed and arranged such that they to define a cylindrical interior space (190), which is formed coaxially to the longitudinal center axis (36) and guides the guide portion (28) of the piston (24).

12. A relay valve (10) for a pneumatic valve unit (14) for a brake system, comprising:

a first assembly component (18) and a second assembly component (20), wherein the first assembly component is configured to receive a hollow-cylindrical guide portion (28) of a piston (24) of the relay valve (10) in an axially guided manner, and wherein the second assembly component (20) has further valve components and a ventilation region of the relay valve (10), wherein at least the first assembly component (18) and the second assembly component (20), in an assembled state, form a pre-assembly unit (26), wherein the first assembly component (18) and the second assembly component (20) are joined together to produce the pre-assembly unit (26) by a bayonet connection (30), wherein the pre-assembly unit (26) is inserted into an interior space of a housing (12) of the valve unit (14), the interior space being bounded by a pot-shaped inner wall (32), and fastened therein, and wherein the first assembly component (18) has two rib groups (90, 92), which are arranged radially opposite one another and are spaced apart from one another in relation to a longitudinal center axis (36) of the relay valve (10), each of the two rib groups having at least three ribs (142, 180, 182, 184, 210, 212), which are spaced apart from one another and directed radially outward, for the purpose of guiding air, wherein at least one alignment projection (144) is arranged on at least one of the ribs (142) in the circumferential direction for producing airflow when the pre-assembly unit (26) is inserted into the housing (12) of the valve unit (14).

13. The relay valve as claimed in claim 12, wherein the first assembly component (18) has two rib groups (90, 92), which are arranged radially opposite one another and are spaced apart from one another in relation to a longitudinal center axis (36) of the relay valve (10), each of the two rib groups having at least three ribs (142, 180, 182, 184, 210, 212), which are spaced apart from one another and directed radially outward, for the purpose of guiding air, wherein the ribs (142, 180, 182, 184, 210, 212) within the two rib groups (90, 92) are respectively formed to be aligned with one another, wherein in at least one of the two rib groups (90, 92) at least one rib (142) has a radially outwardly directed alignment projection (144) which is arranged, as an assembly aid to ensure a properly aligned installation position of the pre-assembly unit (26) in the circumferential direction with an airflow, at least in certain regions form-fittingly in an associated, geometrically complementary cutout (146) in the inner wall (32) of the housing (12) of the valve unit (14).

14. The relay valve as claimed in claim 12, wherein the first assembly component (18) has two rib groups (90, 92), which are arranged radially opposite one another and are spaced apart from one another in relation to a longitudinal center axis (36) of the relay valve (10), each of the two rib groups having at least three ribs (142, 180, 182, 184, 210, 212), which are spaced apart from one another and directed radially outward, for the purpose of guiding air, wherein these ribs (142, 180, 182, 184, 210, 212) within the two rib groups (90, 92) are respectively formed to be aligned with one another, wherein in at least one of the two rib groups (90, 92) at least one rib (142) has a radially outwardly directed alignment projection (144) which serves as a visual assembly aid to ensure a properly aligned installation position of the pre-assembly unit (26) in the circumferential direction with an airflow, without this alignment projection (144) engaging in an associated cutout in the inner wall (32) of the housing (12) of the valve unit (14) for this purpose.

* * * * *